US008505661B2

(12) United States Patent
Tsuji et al.

(10) Patent No.: US 8,505,661 B2
(45) Date of Patent: Aug. 13, 2013

(54) WORK VEHICLE WITH ENGINE COMPARTMENT AND EXHAUST GAS TREATMENT ARRANGEMENT

(75) Inventors: Tomoaki Tsuji, Hirakata (JP); Hiroshi Nakagami, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/389,572

(22) PCT Filed: Jul. 25, 2011

(86) PCT No.: PCT/JP2011/066799
§ 371 (c)(1),
(2), (4) Date: Feb. 8, 2012

(87) PCT Pub. No.: WO2012/017845
PCT Pub. Date: Feb. 9, 2012

(65) Prior Publication Data
US 2012/0138379 A1    Jun. 7, 2012

(30) Foreign Application Priority Data

Aug. 2, 2010  (JP) .................................. 2010-173376

(51) Int. Cl.
*B60K 11/04* (2006.01)
(52) U.S. Cl.
USPC ...................................................... 180/68.4
(58) Field of Classification Search
CPC ........................................................ B60K 11/08
USPC ................... 180/309, 68.1, 68.3, 68.4, 69.2, 180/296; 165/41, 51, 122; 123/41.01, 41.65, 123/41.71; 296/100.09
See application file for complete search history.

(56) References Cited

U.S. PATENT DOCUMENTS

| 3,897,847 | A | * | 8/1975 | Knutson ....................... 180/68.4 |
| 4,060,143 | A | * | 11/1977 | Matsumoto et al. .......... 180/296 |
| 4,071,009 | A | * | 1/1978 | Kraina ....................... 123/198 E |
| 4,074,525 | A | * | 2/1978 | Le Salver ........................ 60/322 |
| 4,081,050 | A | * | 3/1978 | Hennessey et al. ............ 180/233 |
| 4,086,976 | A | * | 5/1978 | Holm et al. ................... 180/68.1 |

(Continued)

FOREIGN PATENT DOCUMENTS

| CN | 1218116 C | 9/2005 |
| JP | 2002-21565 A | 1/2002 |
| JP | 2003-113715 A | 4/2003 |
| JP | 2009-35111 A | 2/2009 |

OTHER PUBLICATIONS

International Search Report of corresponding PCT Application No. PCT/JP2011/066799.

*Primary Examiner* — Katy M Ebner
*Assistant Examiner* — Brodie Follman
(74) *Attorney, Agent, or Firm* — Global IP Counselors, LLP

(57) ABSTRACT

In a work vehicle, an engine compartment is disposed forwards of a cab. An exhaust gas treatment device is disposed over an engine in the engine compartment. A radiator is disposed forwards of the exhaust gas treatment device (33) in the engine compartment. A blower is configured to generate an airflow passing through the radiator from back to front of the radiator. The exhaust gas treatment device is slanted with respect to a vehicle width direction for increasing a distance between the exhaust gas treatment device and the radiator towards a first lateral face portion. Further, the first lateral face portion includes air inlets facing a space between the exhaust gas treatment device and the radiator.

14 Claims, 7 Drawing Sheets

(56) References Cited

U.S. PATENT DOCUMENTS

| | | | |
|---|---|---|---|
| 4,388,804 A * | 6/1983 | Bushmeyer | 60/319 |
| 4,454,926 A * | 6/1984 | Akins | 180/68.1 |
| 4,689,060 A * | 8/1987 | Koske | 55/385.3 |
| 4,696,361 A * | 9/1987 | Clark et al. | 180/68.4 |
| 4,917,201 A * | 4/1990 | Fujikawa et al. | 180/68.2 |
| 4,940,100 A * | 7/1990 | Ueda | 180/68.1 |
| 5,207,187 A * | 5/1993 | Kurohara et al. | 123/41.7 |
| 5,678,648 A * | 10/1997 | Imanishi et al. | 180/68.1 |
| 5,689,953 A * | 11/1997 | Yamashita et al. | 60/316 |
| 5,709,175 A * | 1/1998 | Carroll | 123/41.49 |
| 5,816,350 A * | 10/1998 | Akira et al. | 180/68.1 |
| 6,155,044 A * | 12/2000 | Kaiho et al. | 60/297 |
| 6,202,777 B1 * | 3/2001 | Surridge | 180/68.1 |
| 6,435,264 B1 * | 8/2002 | Konno et al. | 165/41 |
| 6,540,036 B1 * | 4/2003 | Sugano | 180/68.1 |
| 6,655,486 B2 * | 12/2003 | Oshikawa et al. | 180/68.1 |
| 6,922,925 B2 * | 8/2005 | Watanabe et al. | 37/466 |
| 7,134,518 B2 * | 11/2006 | Arai et al. | 180/68.1 |
| 7,143,852 B2 * | 12/2006 | Yatsuda et al. | 180/69.2 |
| 7,278,504 B2 * | 10/2007 | Smith et al. | 180/68.3 |
| 7,717,205 B2 * | 5/2010 | Kertz et al. | 180/68.3 |
| 8,167,067 B2 * | 5/2012 | Peterson et al. | 180/68.2 |
| 8,256,551 B2 * | 9/2012 | Entriken et al. | 180/68.1 |
| 8,347,994 B2 * | 1/2013 | Bering et al. | 180/68.3 |
| 2002/0017408 A1 * | 2/2002 | Oshikawa et al. | 180/69.2 |
| 2003/0066209 A1 * | 4/2003 | Takezaki et al. | 37/197 |
| 2004/0200649 A1 * | 10/2004 | Yatsuda et al. | 180/69.2 |
| 2005/0077062 A1 * | 4/2005 | Fukazawa et al. | 172/776 |
| 2006/0144350 A1 * | 7/2006 | Nakashima et al. | 123/41.01 |
| 2010/0071978 A1 * | 3/2010 | Kisse | 180/68.2 |
| 2010/0155013 A1 * | 6/2010 | Braun et al. | 165/41 |
| 2010/0219008 A1 * | 9/2010 | Isaka et al. | 180/68.1 |
| 2010/0236855 A1 * | 9/2010 | Matsushita et al. | 180/69.2 |
| 2010/0269494 A1 * | 10/2010 | Saito et al. | 60/311 |
| 2011/0011665 A1 * | 1/2011 | Peterson et al. | 180/309 |
| 2011/0023472 A1 * | 2/2011 | Saito et al. | 60/311 |
| 2011/0139525 A1 * | 6/2011 | Karl | 180/68.1 |
| 2011/0173962 A1 * | 7/2011 | Miwa et al. | 60/311 |
| 2011/0192671 A1 * | 8/2011 | Mitsuda et al. | 180/309 |
| 2011/0284308 A1 * | 11/2011 | Mariner et al. | 180/309 |
| 2012/0247861 A1 * | 10/2012 | Mizuno et al. | 180/296 |

* cited by examiner

WORK VEHICLE WITH ENGINE COMPARTMENT AND EXHAUST GAS TREATMENT ARRANGEMENT

CROSS-REFERENCE TO RELATED APPLICATIONS

This application claims priority to Japanese Patent Application No. 2010-173376 filed on Aug. 2, 2010, the disclosure of which is hereby incorporated herein by reference in its entirety.

FIELD OF THE INVENTION

The present invention related to a work vehicle.

BACKGROUND ART

In some work vehicles, an engine compartment is disposed forwards of a cab. The engine compartment accommodates a variety of devices such as an engine, a radiator, a blower and etc. For instance, an exhaust pipe is connected to the engine through a muffler while being upwardly protruding from the top face of the engine compartment, as described in Japan Laid-open Patent Application Publication No. JP-A-2003-113715. The radiator is disposed forwards of the engine. The blower is configured to generate an airflow passing through the radiator in order to cool down a coolant flowing through the radiator. Further, the engine compartment includes a plurality of vent holes bored through the lateral faces thereof. Meanwhile, some work vehicles (e.g., bulldozers) are configured to execute a variety of works using a work implement (e.g., a blade) attached to the front part of the vehicle body. In this type of work vehicles, foreign material (e.g., earth and dust) easily enters the engine compartment from the front side of the vehicle body. In view of the above, work vehicles of this type include a blower configured to generate an airflow passing through the radiator from back to front of the radiator. Accordingly, air is inhaled into the engine compartment through the vent holes bored through the lateral faces of the engine compartment. The inhaled air flows through the space produced between the engine and the radiator, passes through the radiator, and is blown out of the front side of the vehicle body. Thus, foreign material can be inhibited from entering the engine compartment from the front side of the vehicle body due to the structure that air is blown out to the forward of the vehicle body after passing through the radiator.

SUMMARY OF THE INVENTION

From the perspective of protection of natural environment, the work vehicles have been recently demanded to further clean exhaust gas. In response, the work vehicles have been embedded with an exhaust gas treatment device configured to clean exhaust gas. For example, the exhaust gas treatment device may be a device for reducing nitrogen oxides ($NO_x$), a device for reducing carbon monoxide (CO) or a device for reducing particulate material.

The exhaust gas treatment device herein includes catalysts and filters for treating exhaust gas. The exhaust gas treatment device is thereby structured larger than the aforementioned muffler. When being accommodated in the engine compartment of the work vehicle as described above, the exhaust gas treatment device occupies a large part of the engine compartment. In this case, air ventilation resistance is increased when air flows towards the radiator. Consequently, cooling efficiency of the radiator may be degraded.

It is an object of the present invention to inhibit degradation in cooling efficiency of a radiator in a work vehicle embedded with an exhaust gas treatment device.

A work vehicle according to a first aspect of the present invention includes a cab, an engine compartment, an engine, an exhaust gas treatment device, a radiator and a blower. The engine compartment is disposed forwards of the cab. The engine compartment includes a first lateral face portion and a second lateral face portion. The first and second lateral face portions are disposed away from each other in a vehicle width direction. The engine is disposed in the engine compartment. The exhaust gas treatment device is disposed over the engine in the engine compartment. The radiator is disposed forwards of the exhaust gas treatment device in the engine compartment. The blower is configured to generate an airflow passing through the radiator from back to front of the radiator. The exhaust gas treatment device is slanted with respect to the vehicle width direction for increasing a distance between the exhaust gas treatment device and the radiator towards the first lateral face portion. Further, the first lateral face portion includes an air inlet facing a space between the exhaust gas treatment device and the radiator.

A work vehicle according to a second aspect of the present invention relates to the work vehicle according to the first aspect of the present invention. The work vehicle further includes an air cleaner. The air cleaner is disposed rearwards of the exhaust gas treatment device in the engine compartment. The air cleaner and the exhaust gas treatment device are slanted to a same side with respect to the vehicle width direction.

A work vehicle according to a third aspect of the present invention relates to the work vehicle according to the second aspect of the present invention. The work vehicle further includes an exhaust pipe and an intake pipe. The exhaust pipe is connected to the exhaust gas treatment device while being upwardly protruding through a top face of the engine compartment. The intake pipe is connected to the air cleaner while being upwardly protruding through the top face of the engine compartment. Further, the cab includes a pair of front pillars. The front pillars are disposed along a front face of the cab while being disposed away from each other in the vehicle width direction. Yet further, one of the front pillars, the exhaust pipe and the intake pipe are linearly aligned in a top view.

A work vehicle according to a fourth aspect of the present invention relates to the work vehicle according to the first aspect of the present invention. The work vehicle further includes a connection tubing. The connection tubing connects the engine and the exhaust gas treatment device. Further, the connection tubing is connected to a part of the exhaust gas treatment device. The connected part of the exhaust gas treatment device is disposed closer to the second lateral face portion than to the first lateral face portion.

A work vehicle according to a fifth aspect of the present invention relates to the work vehicle according to the fourth aspect of the present invention. In the work vehicle, the connection tubing is connected to a front part of the exhaust gas treatment device.

A work vehicle according to a sixth aspect of the present invention relates to the work vehicle according to one of the fourth and fifth aspects of the present invention. In the work vehicle, the connection tubing is connected to a part of the engine. The connected part of the engine is disposed closer to the first lateral face portion than to the second lateral face portion.

A work vehicle according to a seventh aspect of the present invention relates to the work vehicle according to the sixth aspect of the present invention. In the work vehicle, the connection tubing includes a vibration absorbing portion configured to absorb vibration.

According to the work vehicle of the first aspect of the present invention, the exhaust gas treatment device is slanted with respect to the vehicle width direction for increasing the distance between the exhaust gas treatment device and the radiator towards the first lateral face portion. Therefore, a large path is reliably produced for the air inhaled into the engine compartment through the air inlet of the first lateral face portion. In other words, the exhaust gas treatment device is slanted with respect to the vehicle width direction for reducing the distance between the exhaust gas treatment device and the radiator towards the second lateral face portion. When inhaled into the engine compartment through the air inlet of the first lateral face portion, air flows along the exhaust gas treatment device and is directed towards the radiator. Ventilation resistance is thereby reduced for the air to be supplied to the radiator. Consequently, degradation in cooling efficiency of the radiator can be inhibited in the work vehicle embedded with the exhaust gas treatment device.

According to the work vehicle of the second aspect of the present invention, the air cleaner and the exhaust gas treatment device are slanted to the same side with respect to the vehicle width direction. Sufficient distance can be thereby reliably produced between the air cleaner and the exhaust gas treatment device. This can mitigate thermal impact of the exhaust gas treatment device on the air cleaner.

According to the work vehicle of the third aspect of the present invention, one of the front pillars, the exhaust pipe and the intake pipe are linearly aligned while being disposed forwards of the cab. This enhances forward visibility from the cab.

According to the work vehicle of the fourth aspect of the present invention, the connection tubing is connected to the part of the exhaust gas treatment device, which is disposed closer to the second lateral face portion than to the first lateral face portion. It is thereby possible to inhibit the connection tubing from blocking the flow of air to be inhaled into the engine compartment through the air inlet of the first lateral face portion.

According to the work vehicle of the fifth aspect of the present invention, the connection tubing is connected to the front part of the exhaust gas treatment device. It is thereby possible to reduce a distance between the exhaust gas treatment device and the engine, compared to the structure that the connection tubing is connected to a lower part of the exhaust gas treatment device. In other words, it is possible to inhibit enlargement of the engine compartment in the vertical (height) direction. Accordingly, a forward field of view required for the work vehicle can be reliably obtained. Further, it is possible to further reduce a distance between the exhaust gas treatment device and the first lateral face portion (or the second lateral face portion) of the engine compartment, compared to the structure that the connection tubing is connected to a lateral part of the exhaust gas treatment device. In other words, it is possible to inhibit enlargement of the engine compartment in the vehicle width direction. Accordingly, a front-lateral field of view required for the work vehicle can be reliably obtained.

According to the work vehicle of the sixth aspect of the present invention, the connection tubing is connected to the part of the engine, which is disposed closer to the first lateral face portion than to the second lateral face portion. In other words, one end of the connection tubing is connected to the part of the engine, which is disposed closer to the first lateral face portion than to the second lateral face portion. On the other hand, the other end of the connection tubing is connected to the part of the exhaust gas treatment device, which is disposed closer to the second lateral face portion than to the first lateral face portion. It is thereby possible to reliably form the connection tubing having a large length.

According to the work vehicle of the seventh aspect of the present invention, the vibration absorbing portion can absorb vibration transmitted to the connection tubing. Large vibrations may generally occur in the work vehicles. According to the present invention, the connection tubing has an ability to absorb vibration. Therefore, sufficient reliability can be achieved for the tubing connection. As described above, it is further possible to reliably form the connection tubing having a large length. The vibration absorbing portion can be thereby easily formed in the connection tubing, compared to the structure with a shorter connection tubing. For example, the structure with a shorter connection tubing refers to a structure that a tubing linearly connects an upper side part, positioned closer to the second lateral face portion, of the engine and a lower side part, positioned closer to the second lateral face portion, of the exhaust gas treatment device.

DETAILED DESCRIPTION OF THE EMBODIMENTS

Figure 1:
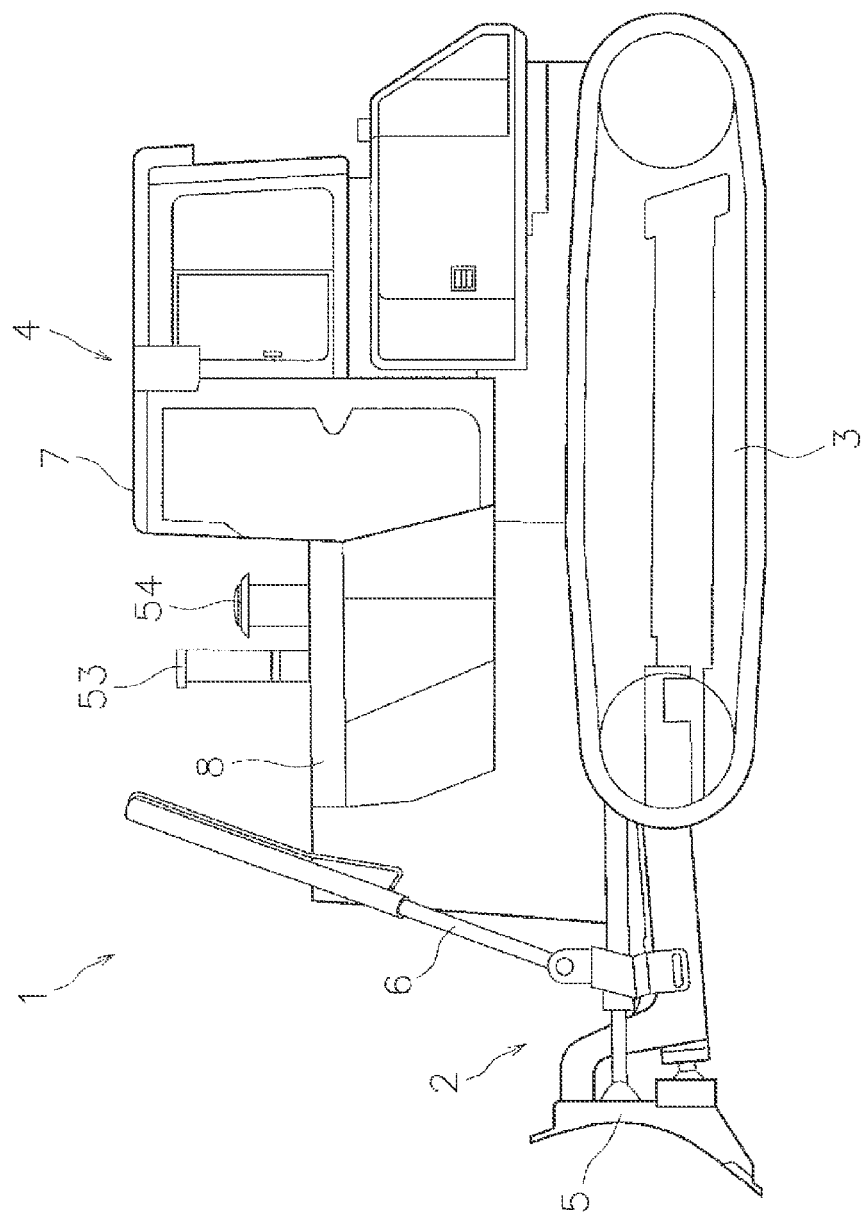
FIG. 1 is a left side view of a work vehicle.

FIG. 1 illustrates a work vehicle 1 according to an exemplary embodiment of the present invention. The work vehicle 1 is a bulldozer. FIG. 1 is a left side view of the work vehicle 1. It should be noted that the directional terms "right", "left" and their related terms will hereinafter refer to corresponding directions seen from an operator forwardly directed in a cab 7. The work vehicle 1 includes a work implement 2, a drive unit 3 and a vehicle body 4. The work implement 2 includes a blade 5 and hydraulic cylinders 6. The blade 5 is disposed forwards of the vehicle body 4. The hydraulic cylinders 6 are configured to be driven by means of hydraulic pressure generated by hydraulic pumps (not illustrated in the figure) and move the blade 5 up and down. The drive unit 3 is a track-type drive unit attached to the vehicle body 4. The vehicle body 4 includes the cab 7 and an engine compartment 8.

Figure 2:
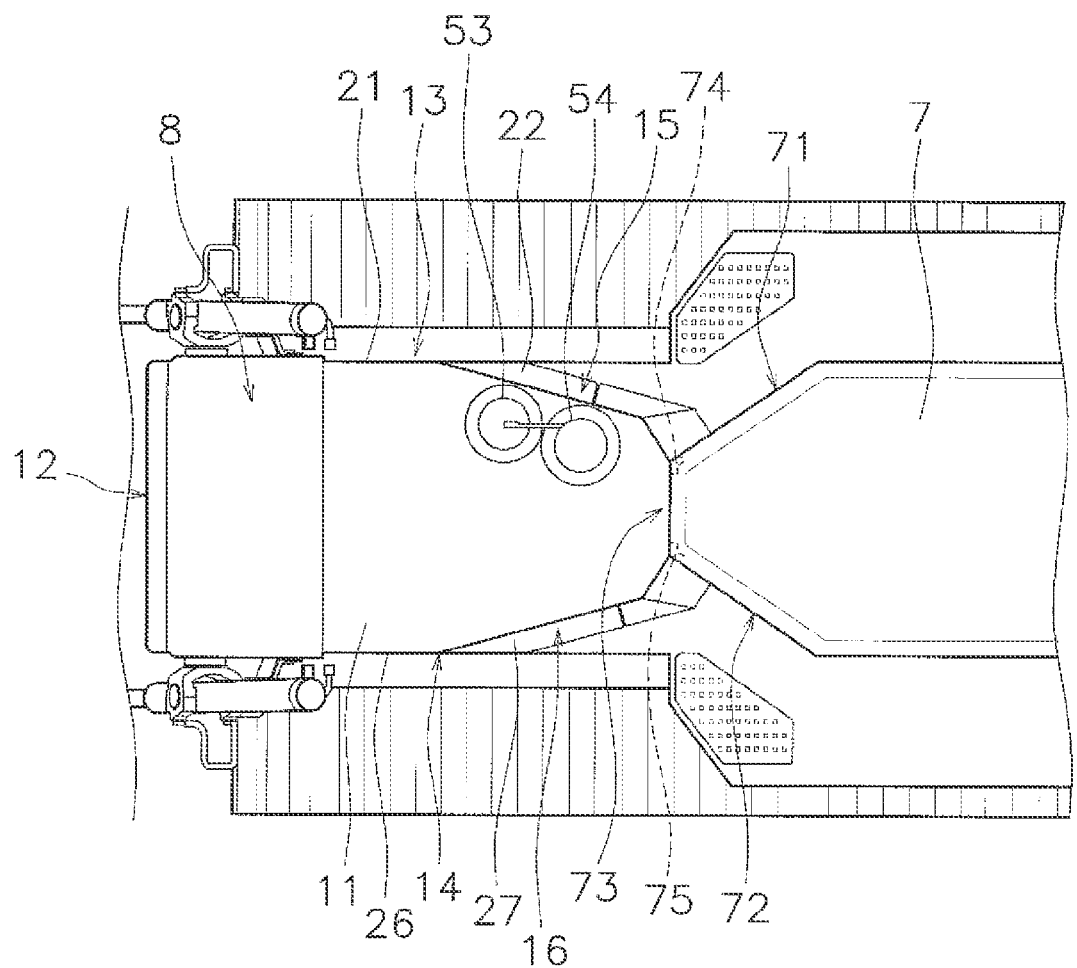
FIG. 2 is a partial top view of the work vehicle.

The cab 7 is embedded with a seat and an operating device (not illustrated in the figure). FIG. 2 is a partial top view of the work vehicle 1. As illustrated in FIG. 2, the front face of the cab 7 includes a first front face portion 71, a second front face portion 72 and a third front face portion 73. In the top view, the first and second front face portions 71 and 72 are slanted with respect to a longitudinal (back-and-forth) direction for gradually reducing the transverse (vehicle width directional) interval therebetween to the forward. The third front face portion 73 is disposed between the front ends of the first and second front face portions 71 and 72. In the top view, the third front face portion 73 is disposed along the transverse direction. Further, the cab 7 includes a pair of front pillars 74 ad 75

(hereinafter respectively referred to as "a first front pillar 74" and "a second front pillar 75"). The first and second front pillars 74 and 75 are disposed along the front face of the cab 7 while being transversely disposed away from each other. The first and second front pillars 74 and 75 are vertically (up-and-down directionally) extended along the right and left edges of the third front face portion 73 (see FIG. 7).

Figure 3:
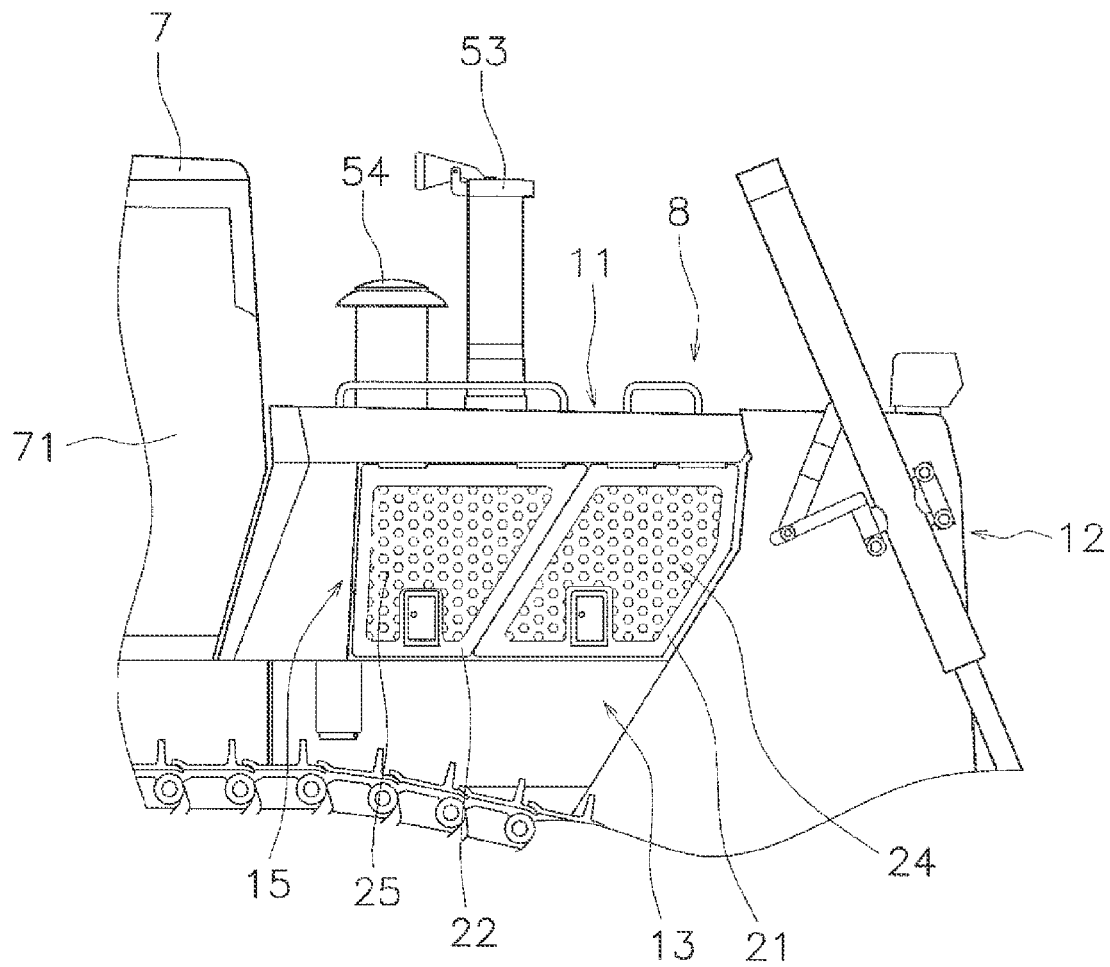
FIG. 3 is a partial right side view of the work vehicle.

The engine compartment 8 is disposed forwards of the cab 7. The engine compartment 8 includes a top face portion 11, a front face portion 12, a first lateral face portion 13 and a second lateral face portion 14. The top face portion 11 has a roughly flat shape. The rear part of the top face portion 11 is tapered for gradually reducing the transverse width thereof to the rearward. The rear end of the top face portion 11 is opposed to the front face of the cab 7. As illustrated in FIG. 3, the top face portion 11 is positioned vertically between the top end and the bottom end of the front face of the cab 7. FIG. 3 is a partial right side view of the work vehicle 1. In the side view, the front face portion 12 is disposed roughly along the vertical direction.

As illustrated in FIG. 2, the first and second lateral face portions 13 and 14 are transversely disposed away from each other. The first lateral face portion 13 includes a first slope 15. The first slope 15 is positioned in the rear upper part of the first lateral face portion 13. The first slope 15 is positioned forwards of the cab 7. More specifically, the first slope 15 is positioned forwards of the first front face portion 71 of the cab 7. The first slope 15 is slanted with respect to the longitudinal direction for getting closer to the transverse center of the vehicle body from front to rear. Further, the first slope 15 is slanted with respect to the vertical direction for getting closer to the transverse center of the vehicle body from bottom to top. The other part of the first lateral face portion 13 is disposed roughly along the vertical and longitudinal directions.

The second lateral face portion 14 is formed roughly bilaterally symmetric to the first lateral face portion 13 through a center line arranged along the longitudinal direction of the work vehicle 1. The second lateral face portion 14 includes a second slope 16. The second slope 16 is positioned in the rear upper part of the second lateral face portion 14. The second slope 16 is positioned forwards of the cab 7. More specifically, the second slope 16 is positioned forwards of the second front face portion 72 of the cab 7. The second slope 16 is slanted with respect to the vertical direction for getting closer to the transverse center of the vehicle body from bottom to top. Further, the second slope 16 is slanted with respect to the longitudinal direction for getting closer to the transverse center of the vehicle body from front to rear. The other part of the second lateral face portion 14 is disposed roughly along the vertical and longitudinal directions.

The first slope 15 is opposed to the first front face portion 71 of the cab 7, while the second slope 16 is opposed to the second front face portion 72 of the cab 7. Therefore, forward visibility from the cab 7 can be enhanced with the first and second slopes 15 and 16 slanted as described above.

Figure 4:
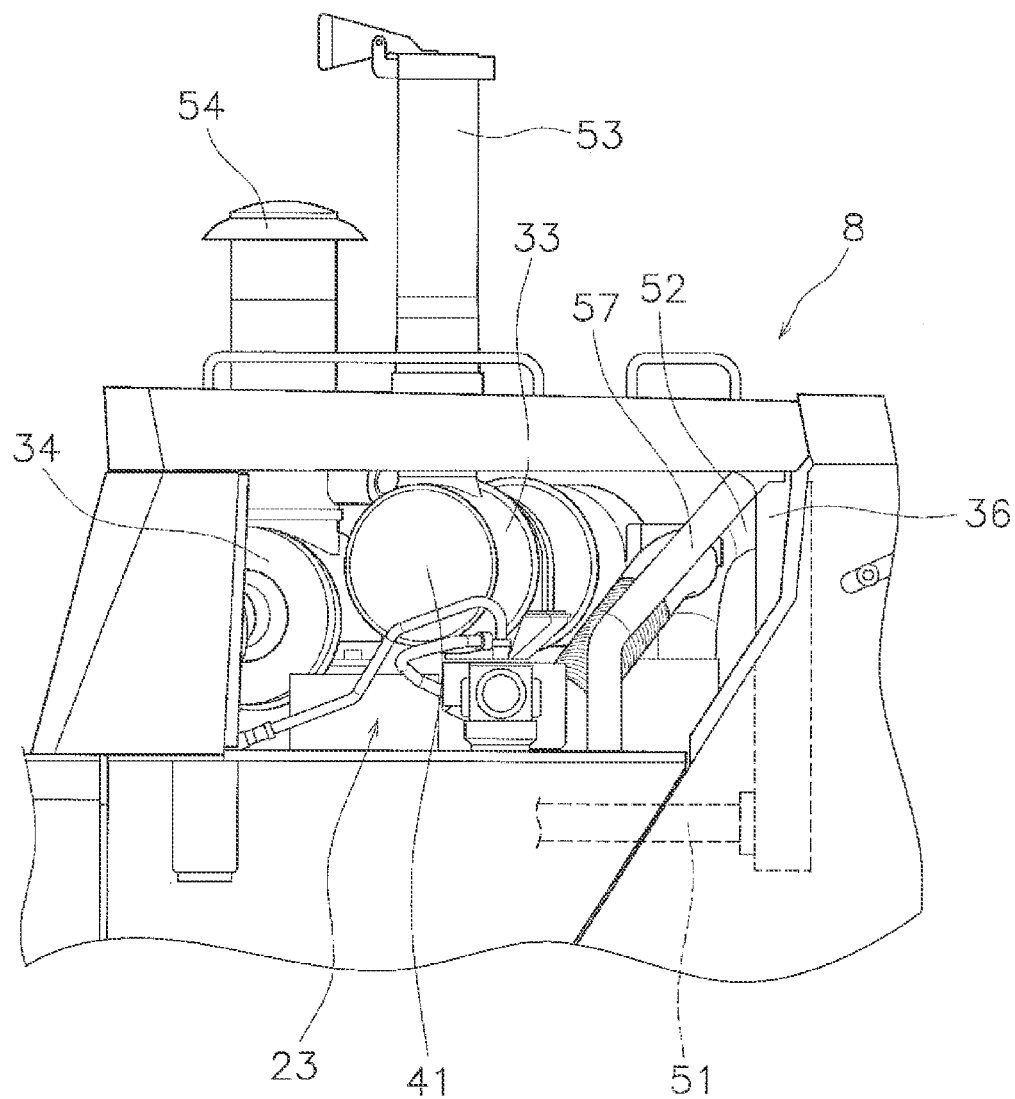
FIG. 4 is a partial right side view of the work vehicle that a first front cover and a first rear cover are removed therefrom.

Further, as illustrated in FIG. 3, the first lateral face portion 13 includes a first front cover 21 and a first rear cover 22. The first front and rear covers 21 and 22 are disposed for openably closing an opening 23 (see FIG. 4) formed in the first lateral face portion 13. FIG. 4 is a partial right side view of the work vehicle 1 where the first front and rear covers 21 and 22 are removed. The first front cover 21 is disposed roughly along the longitudinal direction. Further, the first front cover 21 is disposed roughly along the vertical direction. The first rear cover 22 is disposed rearwards of the first front cover 21. As illustrated in FIG. 2, the first rear cover 22 is included in the aforementioned first slope 15. Therefore, the first rear cover 22 is slanted with respect to the vertical direction for getting closer to the transverse center of the vehicle body from bottom to top. Further, the first rear cover 22 is slanted with respect to the longitudinal direction for getting closer to the transverse center of the vehicle body from front to rear. As illustrated in FIG. 3, the first front cover 21 includes an air inlet 24 communicated with the inside of the engine compartment 8. Likewise, the first rear cover 22 includes an air inlet 25 communicated with the inside of the engine compartment 8. Each of the air inlets 24 and 25 includes a plurality of apertures.

As illustrated in FIG. 2, the second lateral face portion 14 includes a second front cover 26 and a second rear cover 27. The second front and rear covers 26 and 27 are disposed for openably closing an opening (not illustrated in the figures) formed in the second lateral face portion 14. The second front cover 26 is disposed roughly along the longitudinal and vertical directions. The second rear cover 27 is disposed rearwards of the second front cover 26. The second rear cover 27 is included in the aforementioned second slope 16. Therefore, the second rear cover 27 is slanted with respect to the vertical direction for getting closer to the transverse center of the vehicle body from bottom to top. Further, the second rear cover 27 is slanted with respect to the longitudinal direction for getting closer to the transverse center of the vehicle body from front to rear. The second rear cover 27 is further elongated than the first rear cover 22 in the longitudinal direction. The rear end of the second rear cover 27 is positioned rearwards of the rear end of the first rear cover 22. Similarly to the first front and rear covers 21 and 22, each of the second front and rear covers 26 and 27 includes an air inlet (not illustrated in the figures) communicated with the inside of the engine compartment 8. Each of the air inlets of the second front and rear covers 26 and 27 includes a plurality of apertures.

Figure 5:
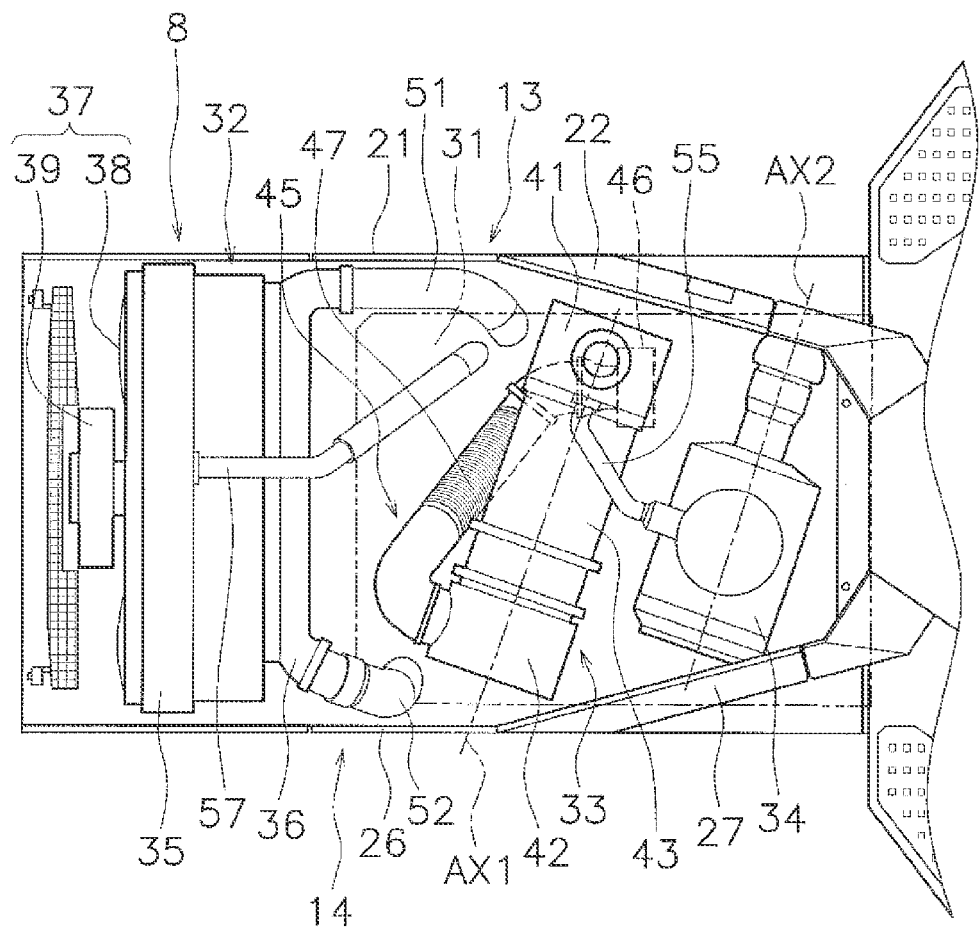
FIG. 5 is a top view of an internal structure of an engine compartment.

As illustrated in FIG. 5, the engine compartment 8 accommodates an engine 31, a radiator assembly 32, an exhaust gas treatment device 33 and an air cleaner 34. FIG. 5 is a top view of the internal structure of the engine compartment 8. For example, the engine 31 is a diesel engine functioning as a driving source configured to drive the aforementioned hydraulic pumps and the drive unit 3.

In the engine compartment 8, the radiator assembly 32 is disposed forwards of the engine 31 and the exhaust gas treatment device 33. The radiator assembly 32 includes a radiator 35, a charge air cooler 36 and a blower 37. The radiator 35 is a device configured to cool down the coolant circulating between the radiator 35 and the engine 31. The radiator 35 is structured for allowing air to pass therethrough in the longitudinal direction. The front and rear faces of the radiator 35 are disposed roughly along the transverse direction. The radiator 35 is disposed forwards of the first front cover 21 and the second front cover 26. The radiator 35 is connected to the engine 31 through a coolant pipe 57.

The charge air cooler 36 (hereinafter referred to as "the CAC 36") is a device configured to cool down the exhaust gas to be supplied to the intake side of the engine 31 from a forced-induction compressor 46 to be described. The CAC 36 is disposed rearwards of the radiator 35 while being disposed roughly along the rear face of the radiator 35. The CAC 36 is structured for allowing air to pass therethrough in the longitudinal direction.

Figure 6:
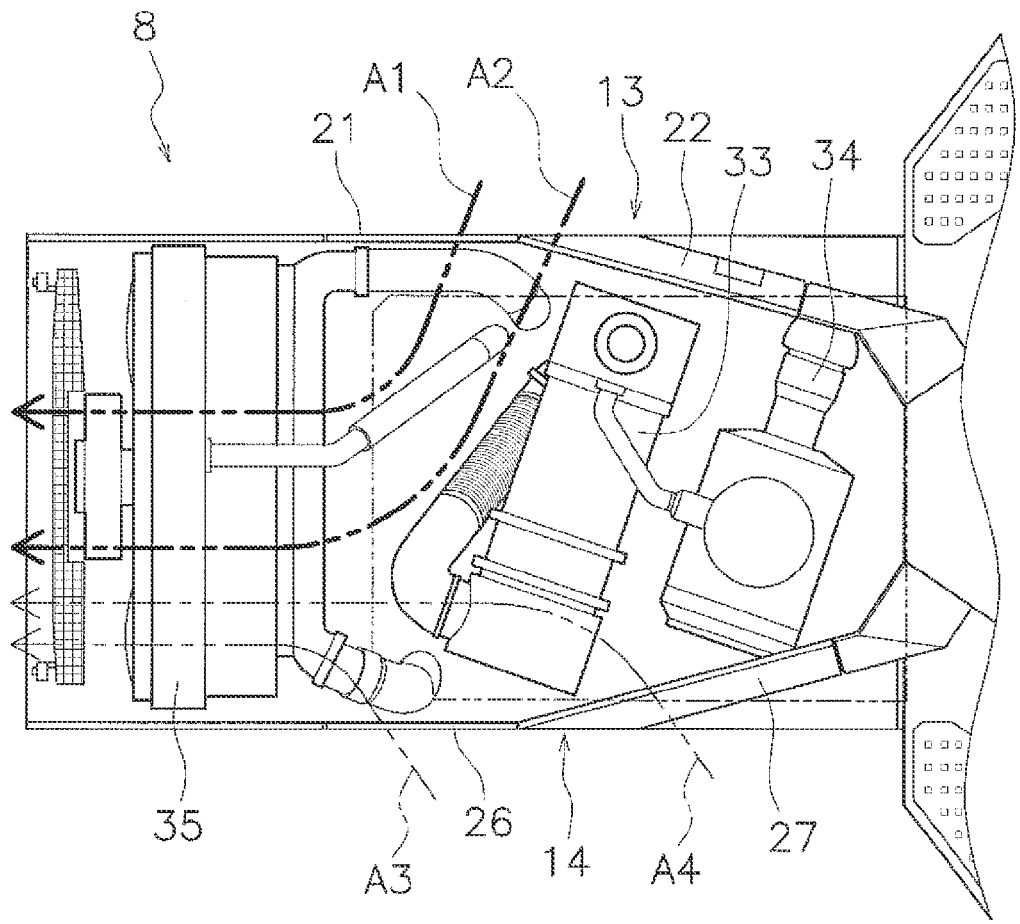
FIG. 6 is a schematic top view of airflows within the engine compartment.

The blower 37 is configured to generate airflows passing through the radiator assembly 32 from back to front of the radiator assembly 32 (see arrows A1 to A4 in FIG. 6). In other words, the blower 37 is configured to generate airflows passing through the radiator 35 from back to front of the radiator 35. The blower 37 includes a cooling fan 38 and a fan motor 39. The cooling fan 38 is disposed forwards of the radiator 35. To generate airflows as described above, the cooling fan 38 is configured to be rotated about a rotational shaft extended in the longitudinal direction. The fan motor 39 is disposed forwards of the cooling fan 38. The fan motor 39 is configured to drive and rotate the cooling fan 38.

The exhaust gas treatment device 33 is a diesel particulate filter type treatment device configured to treat the exhaust gas from the engine 31. The exhaust gas treatment device 33 is configured to trap particulate material contained in the exhaust gas using a filter and burn the trapped particulate material using a heater attached to the filter. The exhaust gas treatment device 33 is disposed over the engine 31 within the engine compartment 8. The exhaust gas treatment device 33 is disposed away from the radiator assembly 32. More specifically, the exhaust gas treatment device 33 is positioned rearwards of the radiator assembly 32. The exhaust gas treatment device 33 has a roughly cylindrical shape. The exhaust gas treatment device 33 is disposed while an axis AX1 thereof is slanted with respect to the transverse direction.

The exhaust gas treatment device 33 includes a first pipe portion 41, a second pipe portion 42 and an intermediate pipe portion 43. The first, second and intermediate pipe portions 41, 42 and 43 are aligned in the axial direction of the exhaust gas treatment device 33. The first pipe portion 41 forms one of the axial ends of the exhaust gas treatment device 33. The second pipe portion 42 forms the other of the axial ends of the exhaust gas treatment device 33. The first pipe portion 41 is a part of the exhaust gas treatment device 33, which is disposed closer to the first lateral face portion 13 than to the second lateral face portion 14. The first pipe portion 41 is disposed adjacent to the first lateral face portion 13. On the other hand, the second pipe portion 42 is a part of the exhaust gas treatment device 33, which is disposed closer to the second lateral face portion 14 than to the first lateral face portion 13. The second pipe portion 42 is disposed adjacent to the second lateral face portion 14. The intermediate pipe portion 43 is disposed between the first and second pipe portions 41 and 42 in the axial direction of the exhaust gas treatment device 33.

The exhaust gas treatment device 33 is slanted with respect to the transverse direction for increasing the distance between the exhaust gas treatment device 33 and the radiator assembly 32 towards the first lateral face portion 13. Specifically, the exhaust gas treatment device 33 is slanted for increasing the distance between the exhaust gas treatment device 33 and the radiator assembly 32 towards the first pipe portion 41. In other words, the distance between the first pipe portion 41 and the radiator assembly 32 is greater than that between the second pipe portion 42 and the radiator assembly 32. As illustrated in FIG. 4, the first pipe portion 41 is opposed to the aforementioned opening 23 of the first lateral face portion 13. More specifically, the first pipe portion 41 is opposed to the first rear cover 22, as illustrated in FIG. 5. On the other hand, the second pipe portion 42 is opposed to the aforementioned opening of the second lateral face portion 14. More specifically, the second pipe portion 42 is opposed to the second front and rear covers 26 and 27.

Further, the engine compartment 8 accommodates a connection tubing 45 connecting the engine 31 and the exhaust gas treatment device 33. The connection tubing 45 is connected to a part of the exhaust gas treatment device 33, which is disposed closer to the second lateral face portion 14 than to the first lateral face portion 13. In other words, the connection tubing 45 is connected to a front part of the exhaust gas treatment device 33, which is opposed to the rear face of the radiator 35. Specifically, one end of the connection tubing 45 is connected to the front part of the second pipe portion 42.

The other end of the connection tubing 45 is connected to a part of the engine 31, which is disposed closer to the first lateral face portion 13 than to the second lateral face portion 14. Specifically, the connection tubing 45 is connected to the engine 31 through the forced-induction compressor 46. The forced-induction compressor 46 (i.e., the connection part between the connection tubing 45 and the engine 31) is positioned lower than the exhaust gas treatment device 33. In a top view, the connection tubing 45 is slanted with respect to the transverse direction for increasing the distance between the connection tubing 45 and the radiator 35 towards the first lateral face portion 13. Further, the connection tubing 45 includes a corrugated portion 47. The corrugated portion 47 functions as a vibration absorbing portion configured to absorb vibration transmitted to the connection tubing 45. The corrugated portion 47 eliminates vibration difference between the engine 31 and the exhaust gas treatment device 33 for preventing excessive load from acting on the connection tubing 45.

Yet further, the engine compartment 8 accommodates a first piping 51 and a second piping 52, both of which are connected to the CAC 36. One end of the first piping 51 is connected to the forced-induction compressor 46. The other end of the first piping 51 is connected to one of the lateral ends of the CAC 36, which is disposed closer to the first lateral face portion 13 in the transverse direction. As illustrated in FIG. 4, the first piping 51 passes below the opening 23 of the first lateral face portion 13. On the other hand, one end of the second piping 52 is connected to an intake port of the engine 31. The other end of the second piping 52 is connected to the other of the lateral ends of the CAC 36, which is disposed closer to the second lateral face portion 14 in the transverse direction. The second piping 52 is backwardly extended from the connected part of the CAC 36 and is then downwardly bent behind the CAC 36.

As illustrated in FIG. 5, the air cleaner 34 is disposed rearwards of the exhaust gas treatment device 33 within the engine compartment 8. In other words, the air cleaner 34 is disposed away from the exhaust gas treatment device 33. The air cleaner 34 is slanted with respect to the transverse direction while being directed along the exhaust gas treatment device 33. In other words, the air cleaner 34 is slanted with respect to the transverse direction for increasing the distance between the air cleaner 34 and the radiator assembly 32 towards the first lateral face portion 13. Also, the air cleaner 34 is disposed roughly in parallel to the exhaust gas treatment device 33. Therefore, an axis AX2 of the air cleaner 34 is arranged roughly in parallel to the axis AX 1 of the exhaust gas treatment device 33. As illustrated in FIG. 4, the top of the air cleaner 34 is positioned lower than that of the exhaust gas treatment device 33 while being positioned higher than the bottom of the exhaust gas treatment device 33. Further, the bottom of the air cleaner 34 is positioned lower than that of the exhaust gas treatment device 33.

It should be noted that the air cleaner 34 and the exhaust gas treatment device 33 are connected through a piping 55. The piping 55 is configured to discharge dust trapped in the air cleaner 34 therefrom using negative pressure to be produced by discharge of the exhaust gas from the exhaust gas treatment device 33.

Further, an exhaust pipe 53 and an intake pipe 54 are upwardly protruding through the top face portion 11 of the engine compartment 8, as illustrated in FIG. 3. The exhaust pipe 53 is connected to the exhaust gas treatment device 33. Specifically, an exhaust port, protruding from the upper part of the first pipe portion 41, is inserted into a lower part of the exhaust pipe 53 without making contact therewith. The exhaust pipe 53 is thus connected to the exhaust gas treatment device 33 while being upwardly protruding from the first pipe portion 41. In the connection part between the exhaust pipe 53 and the exhaust port of the exhaust gas treatment device 33, the tip diameter of the exhaust port is less than the inner diameter of the exhaust pipe 53. Thus, the connection part functions as an orifice. Accordingly, air in the upper part of the engine compartment 8 is configured to be discharged together with the exhaust gas and the dust to the outside through the exhaust pipe 53 by means of the negative pressure to be produced in exhaustion. The intake pipe 54 is connected to the air cleaner 34. As illustrated in FIG. 2, the exhaust pipe 53 and the intake pipe 54 are transversely off-centered on the same side on the top face portion 11 of the engine compartment 8. Specifically, the exhaust pipe 53 and the intake pipe 54 are off-centered towards the first lateral face portion 13 from the transverse center on the top face portion 11 of the engine compartment 8. In the top view, the aforementioned first front pillar 74, the exhaust pipe 53 and the intake pipe 54 are linearly aligned.

The work vehicle 1 according to the present exemplary embodiment has the following features.

In the work vehicle 1, a large distance is reliably produced between the radiator 35 and the end of the exhaust gas treatment device 33 on the first lateral face portion 13 side. Therefore, air easily flows into the engine compartment 8 through the air inlets 24 and 25 of the first lateral face portion 13. Further, the exhaust gas treatment device 33 is slanted with respect to the transverse direction for reducing the distance between the exhaust gas treatment device 33 and the radiator 35 towards the second lateral face portion 14. When inhaled into the engine compartment 8 through the air inlets 24 and 25 of the first lateral face portion 13, air flows along the exhaust gas treatment device 33 and is directed towards the radiator 35, as depicted with the arrows A1 and A2 in FIG. 6. The aforementioned structure reduces ventilation resistance of the air to be supplied to the radiator 35 in the work vehicle 1. Accordingly, degradation in cooling efficiency of the radiator 35 can be inhibited even when the engine compartment 8 accommodates the exhaust gas treatment device 33 formed larger than a well-known muffler. It should be noted that the second lateral face portion 14 includes the air inlets similarly to the first lateral face portion 13. Therefore, air is inhaled into the engine compartment 8 through the second lateral face portion 14 as depicted with the arrows A3 and A4 in FIG. 6.

The exhaust gas treatment device 33 is slanted with respect to the transverse direction. Therefore, it is possible to increase the volume of the exhaust gas treatment device 33 allowed to be accommodated in the engine compartment 8, compared to the structure that the exhaust gas treatment device 33 is disposed along the transverse direction.

The air cleaner 34 is disposed in parallel to the exhaust gas treatment device 33. Therefore, a sufficient distance can be reliably produced between the air cleaner 34 and the exhaust gas treatment device 33. In other words, one end of the air cleaner 34 is prevented from being disposed extremely closer to the exhaust gas treatment device 33. This mitigates thermal impact of the exhaust gas treatment device 33 on the air cleaner 34. Therefore, thermal impact on the air cleaner 34 is prevented even when a component made of resin, for instance, is used as a component of the air cleaner 34.

Figure 7:
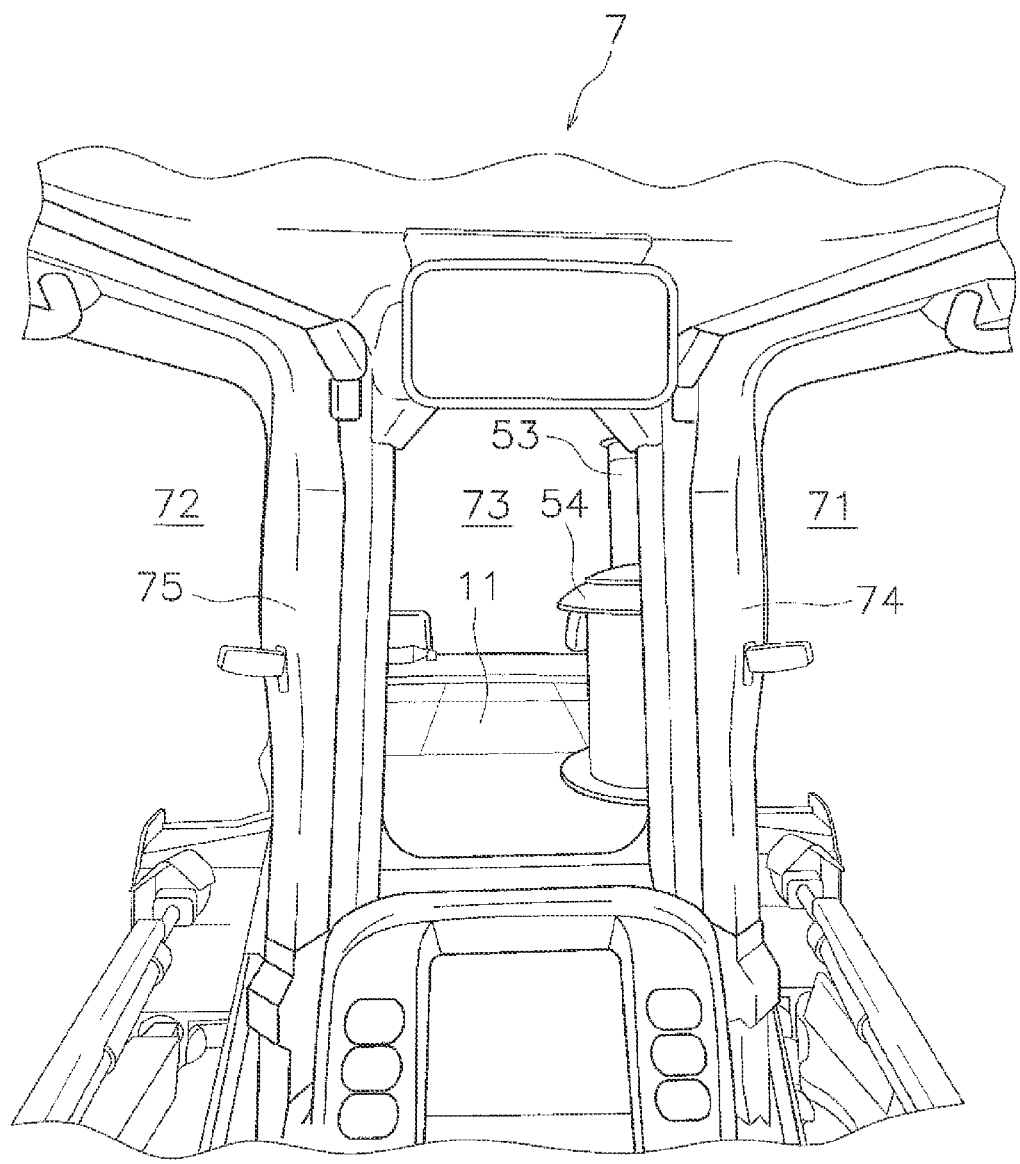
FIG. 7 is a diagram illustrating a forward view from the inside of a cab.

The first front pillar 74, the exhaust pipe 53 and the intake pipe 54 are linearly aligned while being disposed forwards of the cab 7. As illustrated in FIG. 7, the exhaust pipe 53 and the intake pipe 54 are overlapped with the first front pillar 74 in a view from the cab 7. It should be noted that FIG. 7 is a diagram illustrating a forward view from the cab 7. The structure inhibits the exhaust pipe 53 and the intake pipe 54 from obstructing the field of view from the cab 7. Therefore, forward visibility from the cab 7 is enhanced.

The connection tubing 45 is connected to the part of the exhaust gas treatment device 33, which is disposed closer to the second lateral face portion 14 than to the first lateral face portion 13. This structure inhibits the connection tubing 45 from blocking the flow of air inhaled into the engine compartment 8 through the air inlets 24 and 25 of the first lateral face portion 13.

The connection tubing 45 is connected to the front part of the exhaust gas treatment device 33. Therefore, a distance can be reduced between the exhaust gas treatment device 33 and the engine 31 compared to the structure that the connection tubing 45 is connected to the lower part of the exhaust gas treatment device 33. Therefore, it is possible to inhibit enlargement of the engine compartment 8 in the vertical (height) direction. Further, a distance can be reduced between the exhaust gas treatment device 33 and the first lateral face portion 13 (or the second lateral face portion 14) of the engine compartment 8, compared to the structure that the connection tubing 45 is connected to a lateral (i.e., right or left) part of the exhaust gas treatment device 33. Therefore, it is possible to inhibit enlargement of the engine compartment 8 in the transverse direction.

One end of the connection tubing 45 is connected to the part of the engine 31, which is disposed closer to the first lateral face portion 13 than to the second lateral face portion 14. On the other hand, the other end of the connection tubing 45 is connected to the part of the exhaust gas treatment device 33, which is disposed closer to the second lateral face portion 14 than to the first lateral face portion 13. It is thereby possible to reliably form the connection tubing 45 having a large length. Therefore, it is easy to form the aforementioned corrugated portion 47 in the connection tubing 45.

An exemplary embodiment of the present invention has been described above. However, the present invention is not limited to the aforementioned exemplary embodiment, and a variety of changes can be herein made without departing from the scope of the present invention. For example, the present invention can be applied to the other work vehicles except for the bulldozers.

As the exhaust gas treatment device 33, it is possible to use a device employing a type different from that of the exhaust gas treatment device 33. For example, a selective catalytic reduction type device, an OC (Oxidation Catalyst) type device or an LNT (Lean NOx Traps) type device may be herein used.

The air inlets may not be necessarily formed in the second lateral face portion 14. However, the air inlets are required to be formed at least in the first lateral face portion 13. It should be herein noted that air can be inhaled into the engine compartment 8 through the air inlets of the second lateral face portion 14 (see arrows A3 and A4 in FIG. 6), although the flow amount of air inhaled through the air inlets of the second lateral face portion 14 is smaller than that inhaled through the air inlets 24 and 25 of the first lateral face portion 13. Therefore, it is preferable to form the air inlets in the second lateral face portion 14 as described in the aforementioned exemplary embodiment.

In the aforementioned exemplary embodiment, the first lateral face portion 13 is disposed on the right side of the vehicle body, while the second lateral face portion 14 is disposed on the left side of the vehicle body. Contrary to this, however, the first lateral face portion 13 may be disposed on the left side of the vehicle body, while the second lateral face portion 14 may be disposed on the right side of the vehicle body.

According to the present invention, degradation in cooling efficiency of a radiator can be inhibited in a work vehicle embedded with an exhaust gas treatment device.

What is claimed is:

1. A work vehicle, comprising:
   a cab;
   an engine compartment disposed forwards of the cab, the engine compartment including a first lateral face portion and a second lateral face portion, the first and second lateral face portions disposed away from each other in a vehicle width direction;
   an engine disposed in the engine compartment;
   an exhaust gas treatment device having a first end adjacent the first lateral face portion and a second end adjacent the second lateral face portion and being disposed over the engine in the engine compartment;
   a radiator disposed forwards of the exhaust gas treatment device in the engine compartment; and
   a blower configured to generate an airflow passing through the radiator from back to front of the radiator,
   wherein the exhaust gas treatment device is slanted with respect to the vehicle width direction for increasing a distance between the first end of the exhaust gas treatment device and the radiator towards the first lateral face portion, and
   the first lateral face portion includes an air inlet facing a space between the exhaust gas treatment device and the radiator.

2. The work vehicle according to claim 1, further comprising
   an air cleaner disposed rearwards of the exhaust gas treatment device in the engine compartment, wherein
   the air cleaner and the exhaust gas treatment device are slanted to a same side with respect to the vehicle width direction.

3. The work vehicle according to claim 1, wherein
   the blower is arranged frontward of the radiator.

4. The work vehicle according to claim 1, wherein
   the first lateral face portion includes a first front cover and a first rear cover,
   the second lateral face portion includes a second front cover and a second rear cover,
   the first rear cover and the second rear cover are slanted with respect to a longitudinal direction of the vehicle so as to get closer to the transverse center of the vehicle body from front to rear, and
   a portion of the exhaust gas treatment device disposed closer to the radiator is arranged between the first front cover and the second front cover and a portion of the exhaust gas treatment device disposed farther from the radiator is arranged between the first rear cover and the second rear cover in a top plan view.

5. The work vehicle according to claim 2, wherein
   the air cleaner is connected to the exhaust gas treatment device with a pipe.

6. The work vehicle according to claim 2, wherein
   the blower is arranged frontward of the radiator.

7. A work vehicle, comprising:
   a cab;
   an engine compartment disposed forwards of the cab, the engine compartment including a first lateral face portion and a second lateral face portion, the first and second lateral face portions disposed away from each other in a vehicle width direction;
   an engine disposed in the engine compartment;
   an exhaust gas treatment device having a first end adjacent the first lateral face portion and a second end adjacent the second lateral face portion and being disposed over the engine in the engine compartment;
   a radiator disposed forwards of the exhaust gas treatment device in the engine compartment;
   a blower configured to generate an airflow passing through the radiator from back to front of the radiator;
   an air cleaner disposed rearwards of the exhaust gas treatment device in the engine compartment;
   an exhaust pipe connected to the exhaust gas treatment device, the exhaust pipe upwardly protruding through a top face of the engine compartment; and
   an intake pipe connected to the air cleaner, the intake pipe upwardly protruding through the top face of the engine compartment,
   wherein the exhaust gas treatment device is slanted with respect to the vehicle width direction for increasing a distance between the first end of the exhaust gas treatment device and the radiator towards the first lateral face portion,
   the first lateral face portion includes an air inlet facing a space between the exhaust gas treatment device and the radiator,
   the cab includes a pair of front pillars disposed along a front face of the cab, the front pillars disposed away from each other in the vehicle width direction, and
   one of the front pillars, the exhaust pipe and the intake pipe are linearly aligned in a top view.

8. The work vehicle according to claim 7, wherein
   the air cleaner and the exhaust gas treatment device are slanted to a same side with respect to the vehicle width direction.

9. A work vehicle, comprising:
   a cab;
   an engine compartment disposed forwards of the cab, the engine compartment including a first lateral face portion and a second lateral face portion, the first and second lateral face portions disposed away from each other in a vehicle width direction;
   an engine disposed in the engine compartment;
   an exhaust gas treatment device having a first end adjacent the first lateral face portion and a second end adjacent the second lateral face portion and being disposed over the engine in the engine compartment;
   a radiator disposed forwards of the exhaust gas treatment device in the engine compartment;
   a blower configured to generate an airflow passing through the radiator from back to front of the radiator; and
   a connection tubing connecting the engine and the exhaust gas treatment device, wherein the exhaust gas treatment device is slanted with respect to the vehicle width direction for increasing a distance between the first end of the exhaust gas treatment device and the radiator towards the first lateral face portion,
   the first lateral face portion includes an air inlet facing a space between the exhaust gas treatment device and the radiator, and
   the connection tubing is connected to a part of the exhaust gas treatment device, the connected part of the exhaust gas treatment device being disposed closer to the second lateral face portion than to the first lateral face portion.

10. The work vehicle according to claim 9, wherein
    the connection tubing is connected to a front part of the exhaust gas treatment device.

11. The work vehicle according to claim 9, wherein
the connection tubing is connected to a part of the engine,
the connected part of the engine being disposed closer to
the first lateral face portion than to the second lateral face
portion.

12. The work vehicle according to claim 11, wherein
the connection tubing includes a vibration absorbing portion configured to absorb vibration.

13. The work vehicle according to claim 10, wherein
the connection tubing is connected to a part of the engine,
the connected part of the engine being disposed closer to
the first lateral face portion than to the second lateral face
portion.

14. The work vehicle according to claim 13, wherein
the connection tubing includes a vibration absorbing portion configured to absorb vibration.

\* \* \* \* \*